United States Patent
Begun et al.

(10) Patent No.: US 8,819,484 B2
(45) Date of Patent: Aug. 26, 2014

(54) DYNAMICALLY RECONFIGURING A PRIMARY PROCESSOR IDENTITY WITHIN A MULTI-PROCESSOR SOCKET SERVER

(75) Inventors: Ralph M. Begun, Raleigh, NC (US); Michael Decesaris, Carrboro, NC (US); Randolph S. Kolvick, Durham, NC (US); Steven L. Vanderlinden, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 13/268,068

(22) Filed: Oct. 7, 2011

(65) Prior Publication Data

US 2013/0091380 A1   Apr. 11, 2013

(51) Int. Cl.
*G06F 11/00* (2006.01)

(52) U.S. Cl.
USPC .......................................... 714/11; 714/4.11

(58) Field of Classification Search
USPC .......................................... 714/4.11, 10, 11
See application file for complete search history.

(56) References Cited

U.S. PATENT DOCUMENTS

| | | | |
|---|---|---|---|
| 4,070,704 A | 1/1978 | Calle et al. | |
| 4,823,256 A | 4/1989 | Bishop et al. | |
| 5,060,140 A | 10/1991 | Brown et al. | |
| 5,627,962 A | 5/1997 | Goodrum et al. | |
| 5,808,886 A * | 9/1998 | Suzuki | 700/4 |
| 5,815,651 A * | 9/1998 | Litt | 714/10 |
| 6,002,851 A * | 12/1999 | Basavaiah et al. | 714/4.5 |
| 6,195,750 B1 * | 2/2001 | Ellsworth | 713/100 |
| 6,199,179 B1 * | 3/2001 | Kauffman et al. | 714/26 |
| 6,233,702 B1 | 5/2001 | Horst et al. | |
| 6,292,905 B1 * | 9/2001 | Wallach et al. | 714/4.12 |
| 6,378,021 B1 | 4/2002 | Okazawa et al. | |
| 6,378,027 B1 * | 4/2002 | Bealkowski et al. | 710/302 |
| 6,550,020 B1 * | 4/2003 | Floyd et al. | 714/10 |
| 6,789,214 B1 * | 9/2004 | De Bonis-Hamelin et al. | 714/15 |
| 7,137,020 B2 * | 11/2006 | Gilstrap et al. | 713/324 |
| 7,216,252 B1 * | 5/2007 | Tu et al. | 714/10 |
| 7,251,746 B2 * | 7/2007 | Fox et al. | 714/13 |
| 7,373,497 B2 | 5/2008 | Circenis et al. | |
| 7,404,105 B2 * | 7/2008 | Arai | 714/13 |
| 7,412,353 B2 * | 8/2008 | Borkar et al. | 702/186 |
| 7,426,657 B2 * | 9/2008 | Zorek et al. | 714/13 |
| 7,895,377 B2 | 2/2011 | Cedar et al. | |
| 8,046,627 B2 * | 10/2011 | Takubo | 714/4.11 |
| 8,078,907 B2 * | 12/2011 | Donlin et al. | 714/13 |
| 2003/0084357 A1 * | 5/2003 | Bresniker et al. | 713/320 |
| 2007/0079075 A1 | 4/2007 | Collier et al. | |

* cited by examiner

*Primary Examiner* — Marc Duncan
(74) *Attorney, Agent, or Firm* — Edward J. Lenart; Katherine S. Brown; Biggers Kennedy Lenart Spraggins LLP

(57) ABSTRACT

Methods, apparatuses, and computer program products for dynamically reconfiguring a primary processor identity within a multi-processor socket server are provided. Embodiments include detecting, by the service processor, a processor socket reconfiguration event corresponding to a first processor socket; disabling, by the service processor, the first processor socket of the server in response to detecting the processor socket reconfiguration event; and reassigning, by the service processor, the primary processor identity to a second processor socket of the server.

17 Claims, 5 Drawing Sheets

DYNAMICALLY RECONFIGURING A PRIMARY PROCESSOR IDENTITY WITHIN A MULTI-PROCESSOR SOCKET SERVER

BACKGROUND OF THE INVENTION

1. Field of the Invention

The field of the invention is data processing, or, more specifically, methods, apparatuses, and computer program products for dynamically reconfiguring a primary processor identity within a multi-processor socket server.

2. Description Of Related Art

Computer systems, such as servers, often have multiple processor sockets to enable multiple processors to attach to a printed circuit board (PCB). A processor socket or processor slot is a mechanical component that provides mechanical and electrical connections between a processor and a PCB. Processor sockets enable easy addition or exchange of processors without soldering the processor or the circuit board. Typically, the processors are used for specific tasks based on their corresponding processor socket identity. In many cases, specifically identified processor sockets have connections to specific other components within the server, such as to an input/output (I/O) subsystem. Further, specifically identified primary, or boot processor sockets, have connections to specific other components within the server, that provide capability to load important firmware required for normal operation of the computer server. Therefore, when a primary processor or processor socket is faulty, the system is unable to load system initialization firmware and perform any useful tasks. Thus, the performance of an entire system may be negatively impacted by a single faulty primary processor, or additionally by any other faulty processor.

SUMMARY OF THE INVENTION

Methods, apparatuses, and computer program products for dynamically reconfiguring a primary processor identity within a multi-processor socket server are provided. Embodiments include detecting, by the service processor, a processor socket reconfiguration event corresponding to a first processor socket failure; disabling, by the service processor, the first processor socket of the server in response to detecting the processor socket reconfiguration event; and reassigning, by the service processor, the primary processor identity to a second processor socket of the server. Further embodiments include modifying second and subsequent processor identities.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
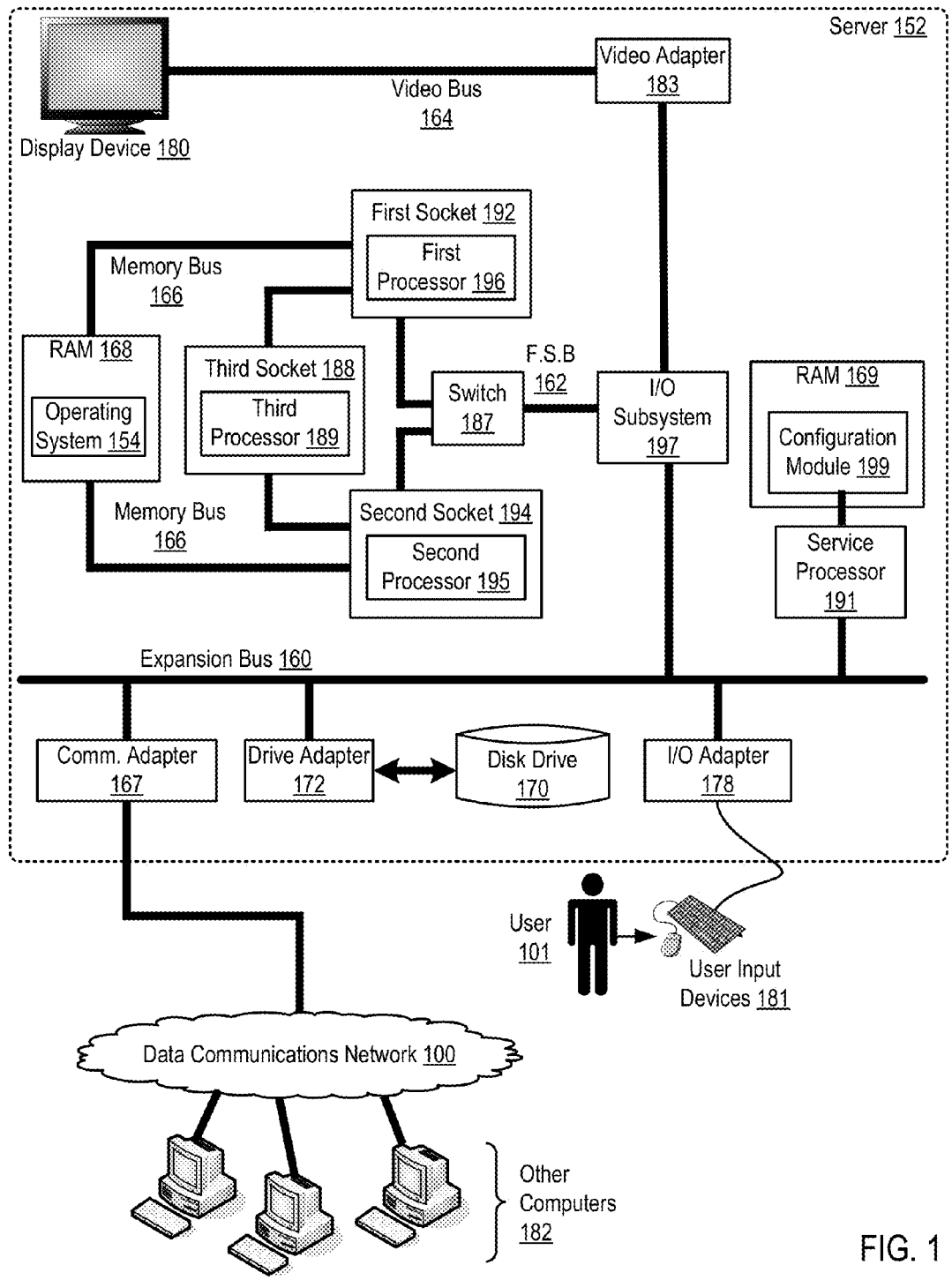
FIG. 1 sets forth a block diagram of automated computing machinery comprising an exemplary computer useful in dynamically reconfiguring a primary processor identity according to embodiments of the present invention.

Exemplary methods, apparatus, and products for dynamically reconfiguring a primary processor identity within a multi-processor socket server in accordance with the present invention are described with reference to the accompanying drawings, beginning with FIG. 1. Dynamically reconfiguring a primary processor identity within a multi-processor socket server in accordance with the present invention is generally implemented with computers, that is, with automated computing machinery. FIG. 1 sets forth a block diagram of automated computing machinery comprising an exemplary server (152) useful in dynamically reconfiguring a primary processor identity according to embodiments of the present invention. The server (152) of FIG. 1 includes multiple processor sockets. A processor socket or processor slot is a mechanical component that provides mechanical and electrical connections between a processor and a PCB. Processor sockets may be made of plastic, a metal lever or latch, and metal contacts for each of the pins or lands of a processor. Depending on how the socket operates, once a processor is inserted into a processor socket, a latch on the processor socket may be closed to secure the processor to a printed circuit board (not shown). In the example of FIG. 1, the server (152) includes a first processor socket (192) coupled to a first processor (196), a second processor socket (194) coupled to a second processor (195), and a third processor socket (188) coupled to a third processor (189). Although three processor sockets are illustrated in the example of FIG. 1, a server may utilize any number of processor sockets for dynamically reconfiguring a primary processor identity according to embodiments of the present invention.

The server (152) of FIG. 1 also includes a switch (187) that is coupled to the two processor sockets (192, 194). The switch (187) of FIG. 1 is also coupled to an input/output (I/O) subsystem (197) and a front side bus (162). The switch (187) is configured to control bus connections between the processor sockets and the front side bus (162) and the I/O subsystem (197). Connections to the front side bus (162) enable a particular processor to access other components of the server (152). For example, the server (152) of FIG. 1 includes random access memory (168) ('RAM') which is connected through a high speed memory bus (166) to the processors (196, 195, 189) and to other components of the server (152).

Each of the processor sockets (192, 194, 188) may be assigned a specific processor identity. A processor identity serves as an indication of the tasks or capabilities of a particular processor socket or the processor coupled to the processor socket. For example, the first processor socket (192) may be assigned a primary processor identity (i.e., "CPU1"). A processor coupled to a processor socket assigned to the primary processor identity has ownership of particular I/O resources and a storage controller, whereas, a secondary processor identity may be associated with ownership of other resources and tasks. A processor identity may be defined by processor identity bits stored in a storage register whose output drives a processor ID pin.

As discussed above, when a processor assigned to a particular processor identity is determined to be faulty, the tasks and resources associated with the particular processor identity may be not used when the processor identity is assigned to a faulty processor. Moreover, when a processor assigned to a primary processor identity is determined to be faulty, the entire server (152) becomes inoperable because resources associated with the primary processor identity may be not used. According to embodiments of the present invention, the processor identities of the processor sockets may be reassigned, and the data path required by the primary processor may be switched. The server of FIG. 1 includes a service processor (191) that is configured to dynamically reconfigure processor identities within the server (152). The service processor (191) may dynamically reconfigure processor identities using computer program instructions stored within a reconfiguration module (199) stored within RAM (169).

The reconfiguration module (199) includes computer program instructions that when executed by the service processor (191) cause the service processor (191) to carry out the steps of: detecting, by the service processor (191), a processor socket reconfiguration event corresponding to a first processor socket (192); disabling, by the service processor (191), the first processor socket (192) of the server (152) in response to detecting the processor socket reconfiguration event; and reassigning, by the service processor (191), a primary processor identity (193) to a second processor socket (194) of the server (152).

In addition, the service processor (191) may be configured to change bus connections between the processor sockets (192, 194) and the front side bus (162) and the I/O subsystem (197). To alter the bus connections, the service processor (191) may control the bus connections within the switch (187). That is, in addition to reassigning the processor identities of the processor sockets (192, 194, and 188), the service processor (191) may also create failover paths between the processor sockets for connection to the I/O subsystem (197) and other components of the server (152). Reconfiguring processor identities according to embodiments of the present invention provides multiple benefits. For example, according to embodiments of the present invention, a failing primary processor or failing processor socket can be configured away from the primary processor identity, allowing the failing processor or failing processor socket to be "cordoned off" and another processor socket identified as the primary processor (e.g., "CPU1").

An example of a benefit of dynamically reconfiguring a primary processor identity according to embodiments of the present invention includes powering off a subset of processor sockets allowing the active subset of a processor to be assigned the primary and secondary processor identities. This enables the server (152) to save power on the unused populated processors until a customer builds up demand for processing capabilities, at which time the customer can configure the dormant subset back into the configuration. That is, the dormant processor sockets may be turned on and assigned new processor identities. This dynamic reconfiguration of processor identities allows for remote "capacity on demand" management of the processor without having to go out to the customer location to populate empty processor sockets in a partially configured system.

Also stored in RAM (168) is an operating system (154). Operating systems useful dynamically reconfiguring a primary processor identity within a multi-processor socket server according to embodiments of the present invention include UNIX™, Linux™, Microsoft XP™, AIX™, IBM's i5/OS™, and others as will occur to those of skill in the art. The operating system (154) and the reconfiguration module (199) in the example of FIG. 1 are shown in RAM (168, 169), but many components of such software typically are stored in non-volatile memory also, such as, for example, on a disk drive (170).

The server (152) of FIG. 1 includes disk drive adapter (172) coupled through expansion bus (160) and I/O Subsystem (197) to processor (196) and other components of the server (152). Disk drive adapter (172) connects non-volatile data storage to the server (152) in the form of disk drive (170). Disk drive adapters useful in computers for dynamically reconfiguring a primary processor identity within a multi-processor socket server according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example server (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), I/O Subsystem (197), and the front side bus (162), which is also a high speed bus.

The exemplary server (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamically reconfiguring a primary processor identity within a multi-processor socket server according to embodiments of the present invention include modems for wired dial-up communications, Ethernet (IEEE 802.3) adapters for wired data communications network communications, and 802.11 adapters for wireless data communications network communications.

Figure 2:
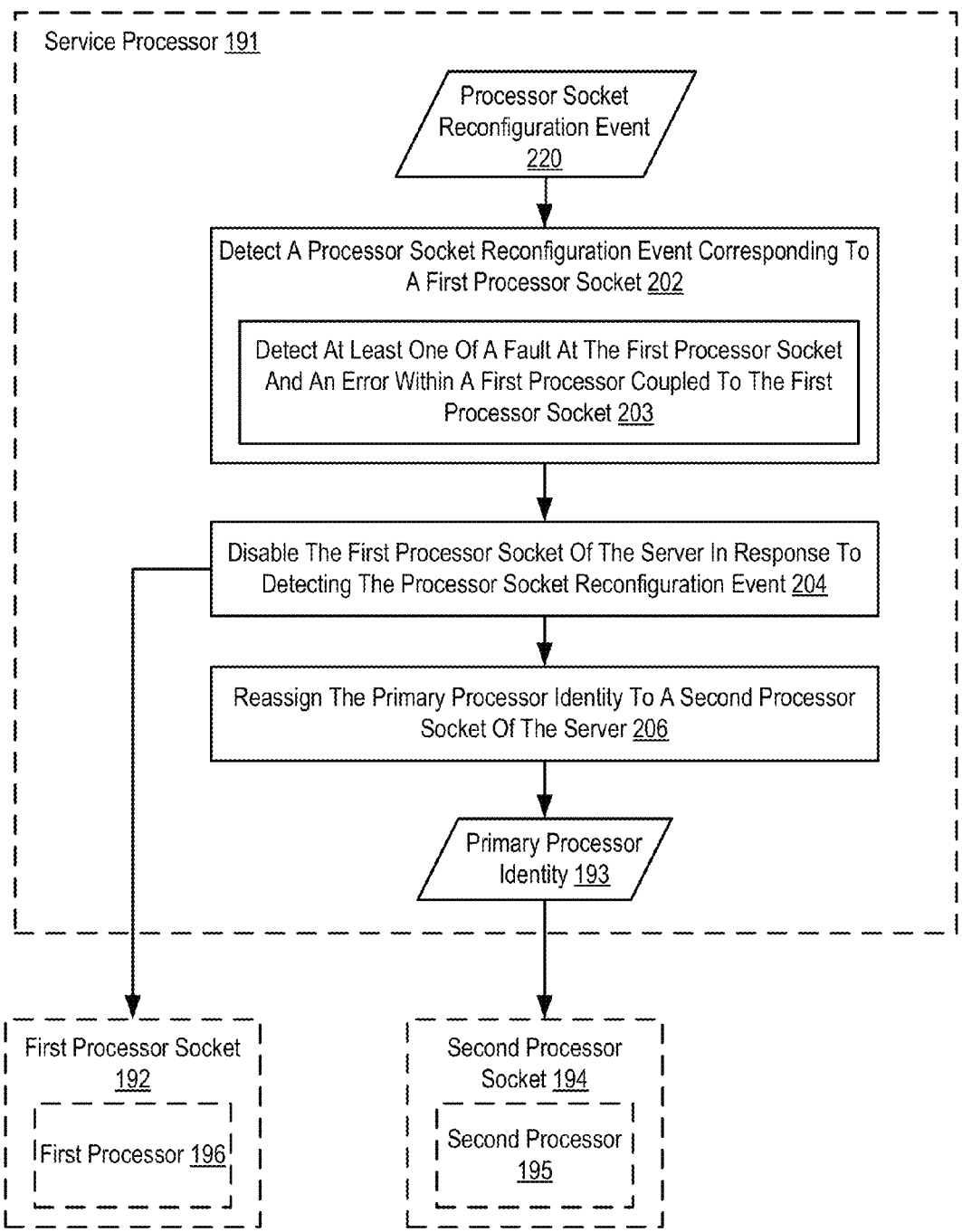
FIG. 2 sets forth a flow chart illustrating an exemplary method for dynamically reconfiguring a primary processor identity within a multi-processor socket server according to embodiments of the present invention FIG. 3 sets forth a flow chart illustrating a further exemplary method for dynamically reconfiguring a primary processor identity within a multi-processor socket server according to embodiments of the present invention.

For further explanation, FIG. 2 sets forth a flow chart illustrating an exemplary method for dynamically reconfiguring a primary processor identity within a multi-processor socket server according to embodiments of the present invention. The method of FIG. 2 includes detecting (202), by the service processor (191), a processor socket reconfiguration event (220) corresponding to a first processor socket (192). Detecting (202) a processor socket reconfiguration event (220) may be carried out by detecting a catastrophic fault in one of the processors (e.g., prevention of startup or halting operation); reading error data associated with the fault, and determining which processor is associated with the error data. Alternatively, a processor socket reconfiguration event may include a mechanical error occurring in a processor socket. In this example, the service processor (191) may determine the processor socket associated with the error; log the error; and send out an alert.

In the method of FIG. 2, detecting (202) a processor socket reconfiguration event (220) optionally includes detecting (203), by the service processor (191), at least one of: a fault at the first processor socket (192) and an error within a first processor (196) coupled to the first processor socket (192). Detecting (203) a fault at the first processor socket (192) may be carried out by determining that one or more applications executing on the server (152) failed to startup or experienced a halting operation. Detecting (203) an error within a first processor (196) coupled to the first processor socket (192) may be carried out by receiving an error alert associated with a mechanical failure of one or more components of the processor socket, likely signaling a socket connection error.

The method of FIG. 2 also includes disabling (204), by the service processor (191), the first processor socket (192) of the server (152) in response to detecting the processor socket reconfiguration event (220). Disabling (204) the first processor socket (192) of the server (152) in response to detecting the processor socket reconfiguration event (220) may be carried out by logging the error data associated with the error; disabling one or more components corresponding to the first processor socket; and contacting the switch (187) to disable one or more bus connections.

The method of FIG. 2 includes reassigning (206), by the service processor (191), the primary processor identity (193) to a second processor socket (194) of the server (152). Reassigning (206) the primary processor identity (193) to a second processor socket (194) of the server (152) may be carried out by changing one or more values associated with the processor socket to indicate the new identity of the processor socket. For example, the primary processor identity (193) may be indicated by ID bits stored in a storage register within the server (152).

Figure 3:
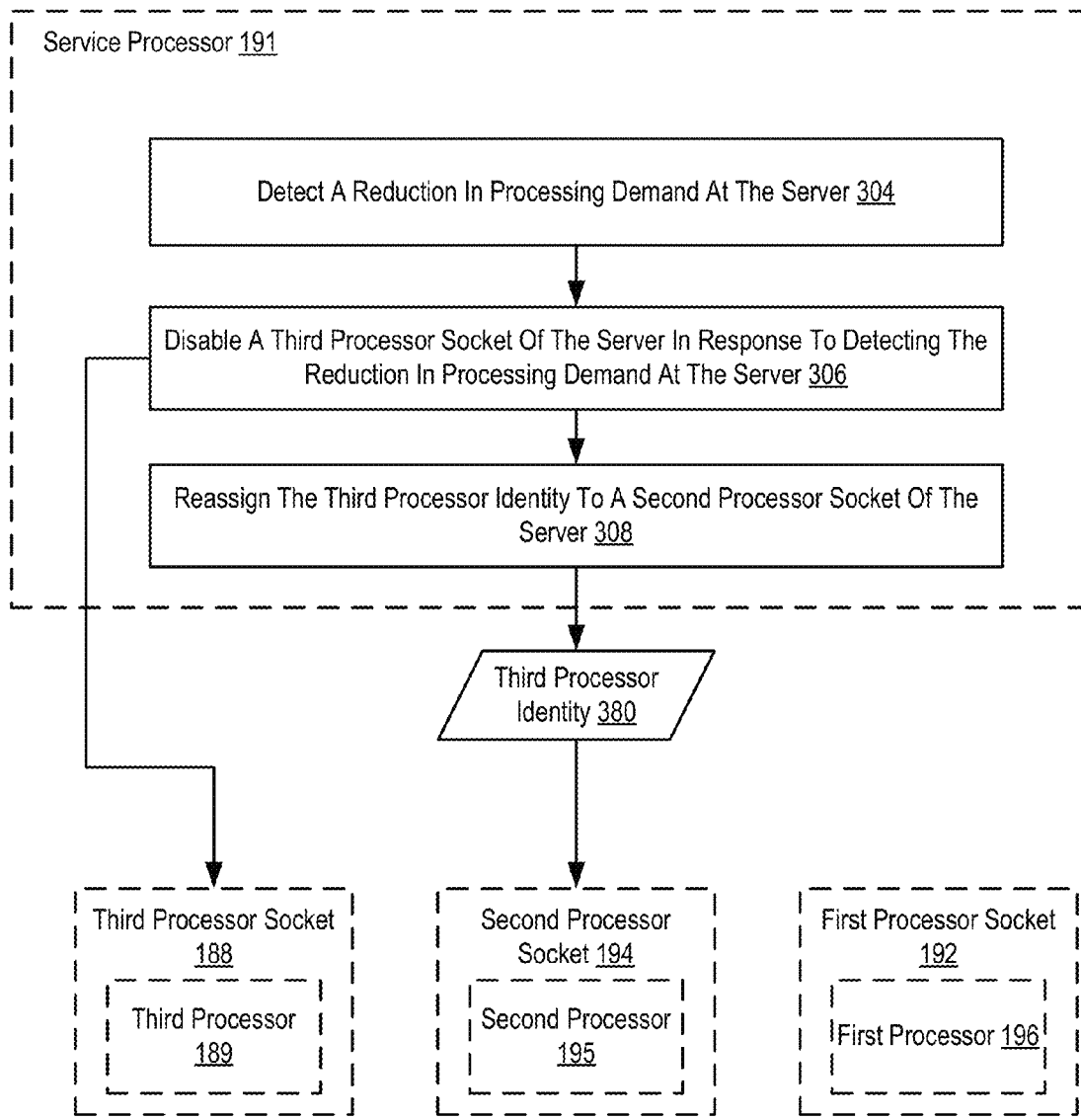

For further explanation, FIG. 3 sets forth a flow chart illustrating a further exemplary method for dynamically reconfiguring a primary processor identity within a multi-processor socket server according to embodiments of the present invention. The method of FIG. 3 includes detecting (304), by the service processor (191), a reduction in processing demand at the server (152). Processing demand may be an indication of the amount of workload needed to be processed at the server (152). Detecting (304) a reduction in processing demand at the server (152) may be carried out by receiving user input indicating workflow levels; and monitoring workflow levels at the processors within the server (152) and determining that the monitored workload levels indicate a reduced processor demand.

The method of FIG. 3 also includes disabling (306), by the service processor (191), a third processor socket (188) of the server (152) in response to detecting the reduction in processing demand. Disabling (306) a third processor socket (188) of the server (152) in response to detecting the reduction in processing demand may be carried out by disabling one or more components corresponding to the third processor socket; and contacting the switch (187) to disable one or more bus connections.

The method of FIG. 3 also includes reassigning (308), by the service processor (191), a third processor identity (380) to the second processor socket (194) of the server (152). Reassigning (308) a third processor identity (380) to the second processor socket (194) of the server (152) may be carried out by changing one or more values associated with the processor socket to indicate the new identity of the processor socket. For example, the third identity (380) may be indicated by ID bits stored in a storage register within the server (152).

Figure 4:
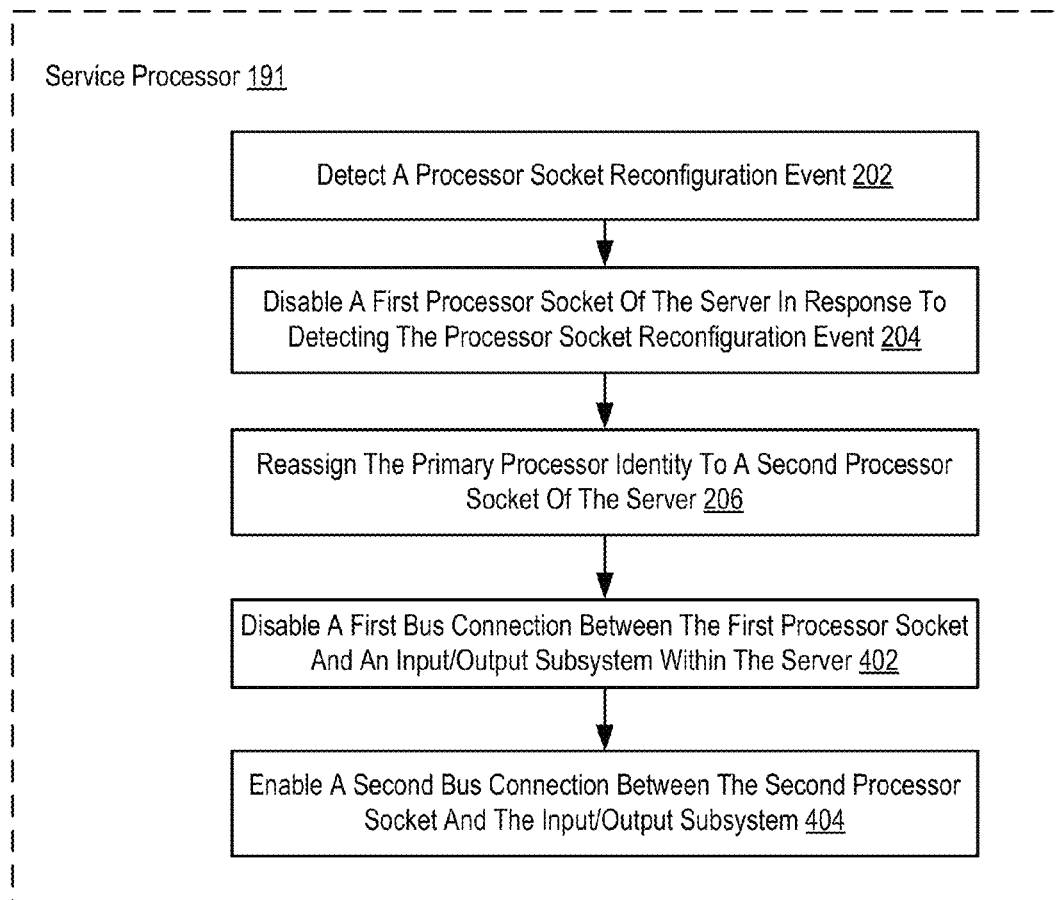
FIG. 4 sets forth a flow chart illustrating a further exemplary method for dynamically reconfiguring a primary processor identity within a multi-processor socket server according to embodiments of the present invention.
Figure 4:
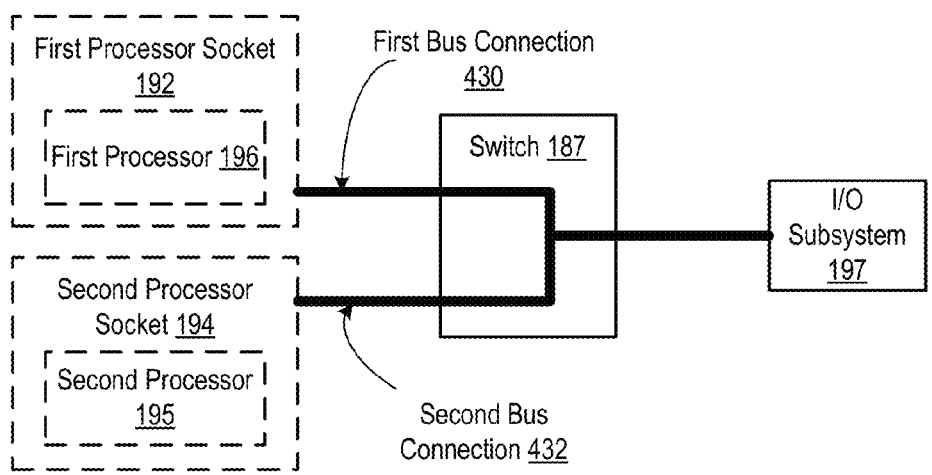

For further explanation, FIG. 4 sets forth a flow chart illustrating a further exemplary method for dynamically reconfiguring a primary processor identity within a multi-processor socket server according to embodiments of the present invention. The method of FIG. 4 is similar to the method of FIG. 2 in that the method of FIG. 4 also includes: detecting (202), by the service processor (191), a processor socket reconfiguration event (220); disabling (204), by the service processor (191), a first processor socket (192) of the server (152) in response to detecting the processor socket reconfiguration event (220); and reassigning (206), by the service processor (191), the primary processor identity (193) to a second processor socket (194) of the server (152).

The method of FIG. 4 also includes disabling (402), by the service processor (191), a first bus connection (430) between the first processor socket (192) and an input/output subsystem (197) within the server (152). Disabling (402) a first bus connection (430) between the first processor socket (192) and an input/output subsystem (197) within the server (152) may be carried out by instructing the switch (187) to disconnect the first processor socket (192) for one or more components of the server (152). For example, the service processor (191) may instruct the switch (187) to disconnect the first processor socket (192) from the I/O subsystem (197).

The method of FIG. 4 also includes enabling (404), by the service processor (191), a second bus connection (432) between the second processor socket (194) and the input/output subsystem (197). Enabling (404) a second bus connection (432) between the second processor socket (194) and the input/output subsystem (197) may be carried out by determining which bus connections are necessary for a processor socket based on the new processor identity of the processor socket; and instructing the switch (187) to establish the bus connections in accordance with the determined bus connections. For example, the service processor (191) may instruct the switch (187) to connect the second processor socket (194) from the I/O subsystem (197). This new bus connection enables the newly established primary processor to access I/O subsystem firmware that is needed for basic server initialization.

Figure 5:
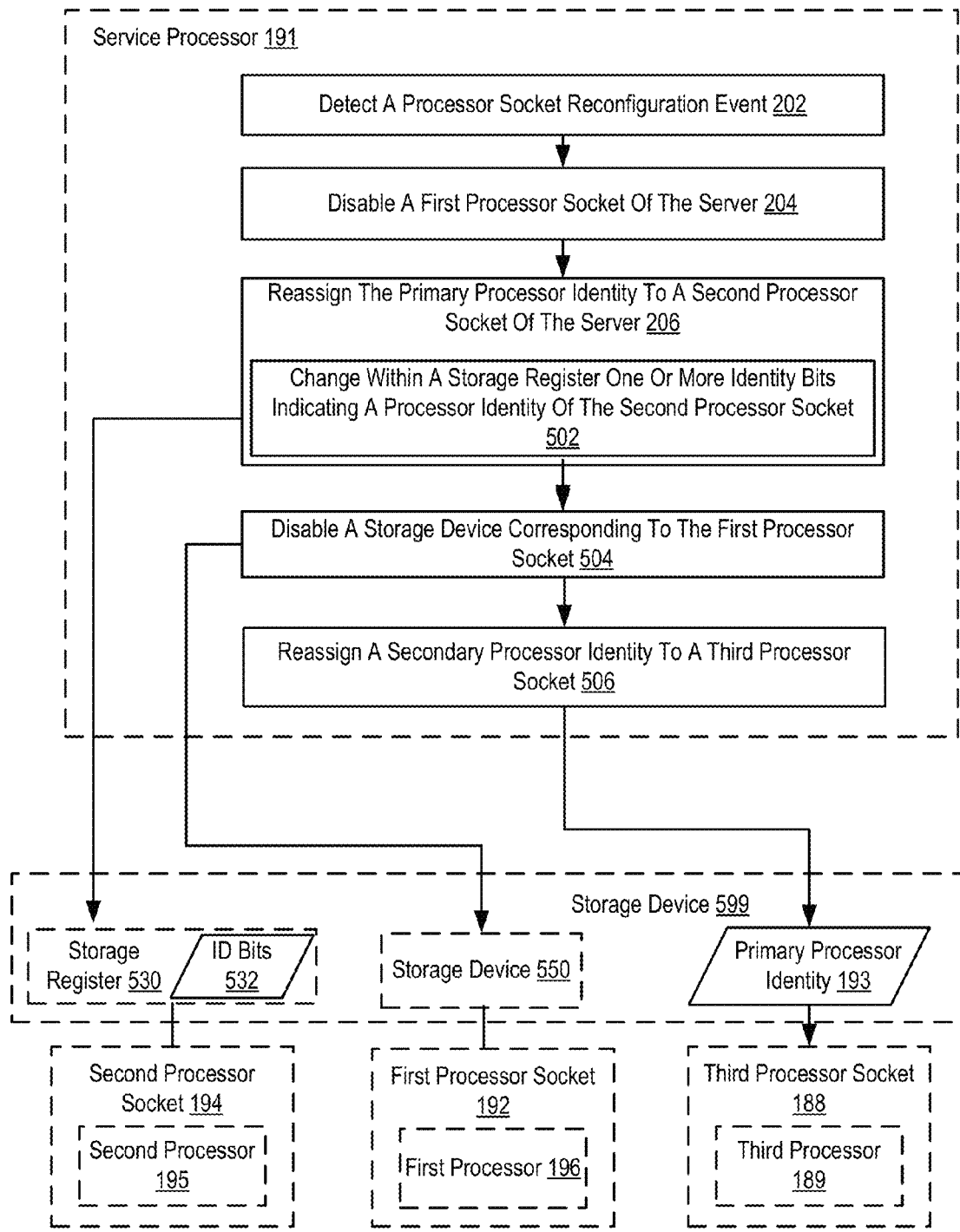
FIG. 5 sets forth a flow chart illustrating a further exemplary method for dynamically reconfiguring a primary processor identity within a multi-processor socket server according to embodiments of the present invention.

For further explanation, FIG. 5 sets forth a flow chart illustrating a further exemplary method for dynamically reconfiguring a primary processor identity within a multi-processor socket server according to embodiments of the present invention. The method of FIG. 5 is similar to the method of FIG. 2 in that the method of FIG. 5 also includes: detecting (202), by the service processor (191), a processor socket reconfiguration event (220); disabling (204), by the service processor (191), a first processor socket (192) of the server (152) in response to detecting the processor socket reconfiguration event (220); and reassigning (206), by the service processor (191), the primary processor identity (193) to a second processor socket (194) of the server (152).

In the method of FIG. 5, however, reassigning (206), by the service processor (191), the primary processor identity (193) to a second processor socket (194) of the server (152) includes changing (502) within a storage register (530), by the service processor (191), one or more identity bits (532) indicating a processor identity of the second processor socket (194). The storage register (530) may be stored in a main storage device (599). The main storage device (599) may be a field programmable gate array (FPGA). Changing (502) within a storage register (530) one or more identity bits (532)

indicating a processor identity of the second processor socket (194) may be carried out by changing values within the storage register (530) to reflect the change in processor identity.

The method of FIG. 5 includes disabling (504), by the service processor (191), a storage device (550) corresponding to the first processor socket (192). Disabling (504) a storage device (550) corresponding to the first processor socket (192) may be carried out by transmitting a signal to the storage device (550) to deactivate; and power down the storage device (550).

The method of FIG. 5 also includes reassigning (506), by the service processor (191), a secondary processor identity (560) to a third processor socket (188). Reassigning (506) a secondary processor identity (560) to a third processor socket (188) may be carried out by changing one or more values associated with the processor socket to indicate the new identity of the processor socket.

Exemplary embodiments of the present invention are described largely in the context of a fully functional computer system for dynamically reconfiguring a primary processor identity within a multi-processor socket server. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically reconfiguring a primary processor identity within a multi-processor socket server, the method comprising:
    detecting, by the service processor, a processor socket reconfiguration event corresponding to a first processor socket, the first processor socket assigned the primary processor identity and the primary processor identity indicating that a processor connected to the processor socket assigned the primary processor identity has ownership of a particular resource of the server;
    disabling, by the service processor, the first processor socket of the server in response to detecting the processor socket reconfiguration event;
    reassigning, by the service processor, the primary processor identity from the first processor socket to a second processor socket of the server such that a processor connected to the second processor socket has ownership of the particular resource of the server;
    disabling, by the service processor, a first bus connection between the first processor socket and an input/output subsystem within the server; and
    enabling, by the service processor, a second bus connection between the second processor socket and the input/output subsystem.

2. The method of claim 1 wherein detecting a processor socket reconfiguration event includes detecting, by the service processor, at least one of: a fault at the first processor socket and an error within a first processor coupled to the first processor socket.

3. The method of claim 1 wherein detecting a processor socket reconfiguration event includes detecting, by the service processor, a reduction in processing demand at the server.

4. The method of claim 1 wherein reassigning the primary processor identity to the second processor socket includes changing within a storage register, by the service processor, one or more identity bits indicating a processor identity of the second processor socket.

5. The method of claim 1 further comprising reassigning, by the service processor, a secondary processor identity to a third processor socket.

6. The method of claim 1 further comprising disabling, by the service processor, a storage device corresponding to the first processor socket.

7. An apparatus for dynamically reconfiguring a primary processor identity within a multi-processor socket server, the apparatus comprising a computer processor, a computer memory operatively coupled to the computer processor, the computer memory having disposed within it computer program instructions that when executed cause the computer processor to carry out the steps of:
    detecting, by the service processor, a processor socket reconfiguration event corresponding to a first processor socket, the first processor socket assigned the primary processor identity and the primary processor identity indicating that a processor connected to the processor socket assigned the primary processor identity has ownership of a particular resource of the server;
    disabling, by the service processor, the first processor socket of the server in response to detecting the processor socket reconfiguration event;
    reassigning, by the service processor, the primary processor identity from the first processor socket to a second processor socket of the server such that a processor connected to the second processor socket has ownership of the particular resource of the server;
    disabling, by the service processor, a first bus connection between the first processor socket and an input/output subsystem within the server; and
    enabling, by the service processor, a second bus connection between the second processor socket and the input/output subsystem.

8. The apparatus of claim 7 wherein detecting a processor socket reconfiguration event includes detecting, by the service processor, at least one of: a fault at the first processor socket and an error within a first processor coupled to the first processor socket.

9. The apparatus of claim 7 wherein detecting a processor socket reconfiguration event includes detecting, by the service processor, a reduction in processing demand at the server.

10. The apparatus of claim 7 wherein reassigning the primary processor identity to the second processor socket includes changing within a storage register, by the service processor, one or more identity bits indicating a processor identity of the second processor socket.

11. The apparatus of claim 7 further comprising reassigning, by the service processor, a secondary processor identity to a third processor socket.

12. The apparatus of claim 7 further comprising disabling, by the service processor, a storage device corresponding to the first processor socket.

13. A computer program product for dynamically reconfiguring a primary processor identity within a multi-processor socket server, the computer program product disposed upon a non-transitory computer readable storage medium, wherein the computer readable storage medium is not a signal, the computer program product comprising computer program instructions capable, when executed, of causing a computer to carry out the steps of:
    detecting, by the service processor, a processor socket reconfiguration event corresponding to a first processor socket, the first processor socket assigned the primary processor identity and the primary processor identity indicating that a processor connected to the processor socket assigned the primary processor identity has ownership of a particular resource of the server;

disabling, by the service processor, the first processor socket of the server in response to detecting the processor socket reconfiguration event;

reassigning, by the service processor, the primary processor identity from the first processor socket to a second processor socket of the server such that a processor connected to the second processor socket has ownership of the particular resource of the server;

disabling, by the service processor, a first bus connection between the first processor socket and an input/output subsystem within the server; and enabling, by the service processor, a second bus connection between the second processor socket and the input/output subsystem.

14. The computer program product of claim 13 wherein detecting a processor socket reconfiguration event includes detecting, by the service processor, at least one of: a fault at the first processor socket and an error within a first processor coupled to the first processor socket.

15. The computer program product of claim 13 wherein detecting a processor socket reconfiguration event includes detecting, by the service processor, a reduction in processing demand at the server.

16. The computer program product of claim 13 wherein reassigning the primary processor identity to the second processor socket includes changing within a storage register, by the service processor, one or more identity bits indicating a processor identity of the second processor socket.

17. The computer program product of claim 13 further comprising reassigning, by the service processor, a secondary processor identity to a third processor socket.

* * * * *